(12) United States Patent
Kamada

(10) Patent No.: US 11,294,231 B2
(45) Date of Patent: Apr. 5, 2022

(54) ILLUMINATION DEVICE AND DISPLAY DEVICE WITH COLORING PORTION FOR SUPPRESSION OF COLOR UNEVENNESS

(71) Applicant: SHARP KABUSHIKI KAISHA, Sakai (JP)

(72) Inventor: Kentaroh Kamada, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 17/003,422

(22) Filed: Aug. 26, 2020

(65) Prior Publication Data

US 2021/0223626 A1 Jul. 22, 2021

Related U.S. Application Data

(60) Provisional application No. 62/963,974, filed on Jan. 21, 2020.

(51) Int. Cl.
*G02F 1/13357* (2006.01)
*G02F 1/1335* (2006.01)

(52) U.S. Cl.
CPC .. *G02F 1/133605* (2013.01); *G02F 1/133603* (2013.01); *G02F 1/133614* (2021.01)

(58) Field of Classification Search
CPC ......... G02F 1/133605; G02F 1/133614; G02F 1/133603
See application file for complete search history.

(56) References Cited

U.S. PATENT DOCUMENTS

| | | | |
|---|---|---|---|
| 10,162,220 B2 | 12/2018 | Kamada | |
| 2012/0320309 A1* | 12/2012 | Hineno | G02F 1/133609 349/64 |
| 2015/0036317 A1* | 2/2015 | Yamamoto | G02F 1/133609 362/84 |
| 2015/0198304 A1* | 7/2015 | Ohkawa | F21K 9/64 362/97.1 |
| 2018/0031922 A1 | 2/2018 | Kamada | |
| 2018/0039006 A1* | 2/2018 | Gotou | G02B 6/005 |
| 2019/0310516 A1 | 10/2019 | Kyoukane et al. | |

FOREIGN PATENT DOCUMENTS

| | | |
|---|---|---|
| JP | 2018181811 A | 11/2018 |
| JP | 2019185921 A | 10/2019 |
| WO | 2016/136787 A1 | 9/2016 |

* cited by examiner

*Primary Examiner* — Tracie Y Green
(74) *Attorney, Agent, or Firm* — ScienBiziP, P.C.

(57) ABSTRACT

An illumination device includes: a substrate including a first face; at least one light source provided to the first face, and configured to emit light; and a wavelength conversion member facing the first face of the substrate, and configured to convert at least a portion of a wavelength, of the light emitted from the light source, into a wavelength having a color different from a similar color of the light emitted from the light source, wherein the substrate includes a first coloring portion constituting at least a portion of the substrate, including at least a portion of the first face, and configured to create the similar color.

11 Claims, 11 Drawing Sheets

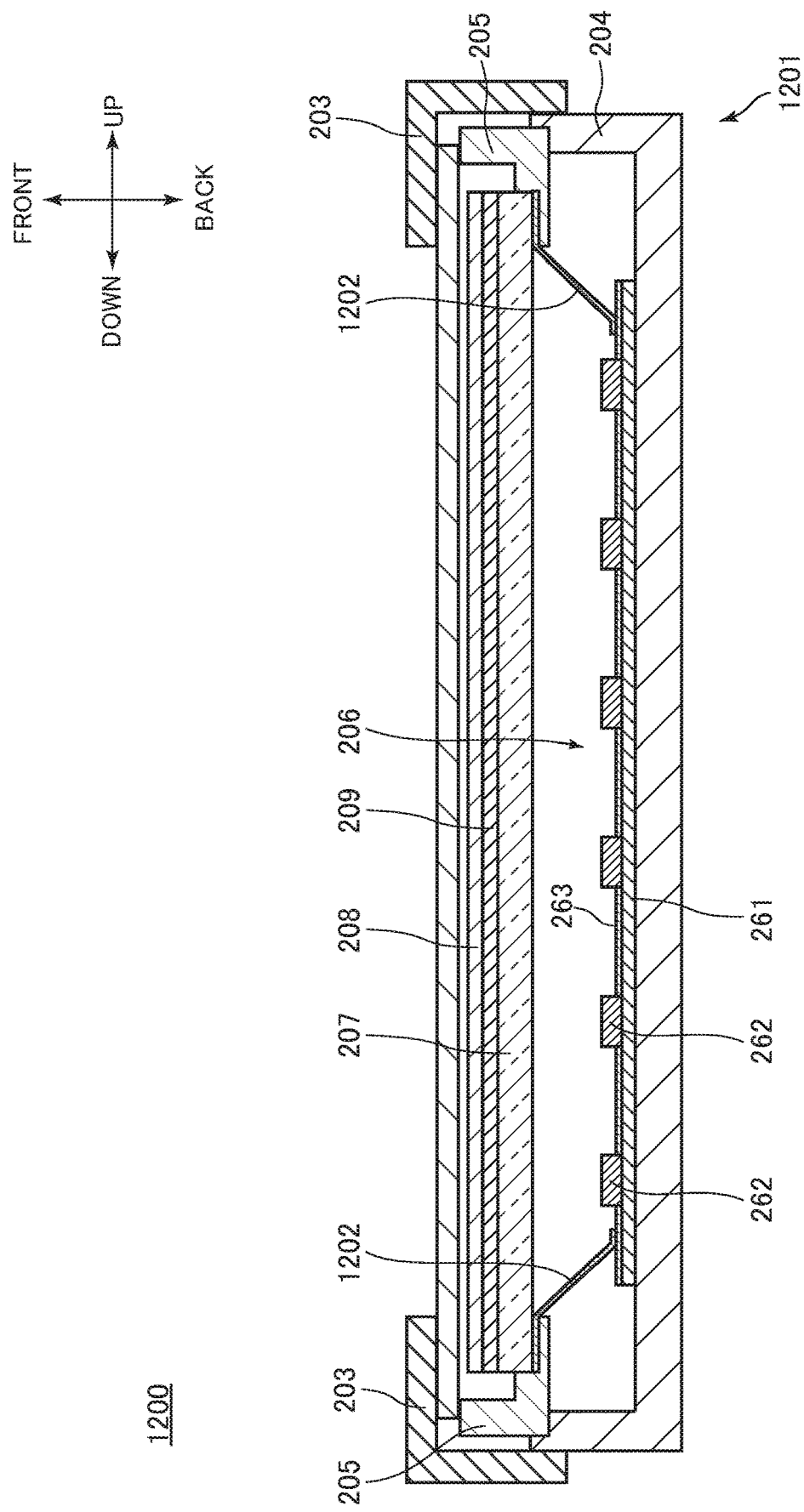

ILLUMINATION DEVICE AND DISPLAY DEVICE WITH COLORING PORTION FOR SUPPRESSION OF COLOR UNEVENNESS

CROSS-REFERENCE TO RELATED APPLICATION

The present application claims priority from Provisional Application No. 62/963,974, the content to which is hereby incorporated by reference into this application.

BACKGROUND OF THE INVENTION

Field of the Invention

The present invention relates to an illumination device and a display device.

Description of the Background Art

WO2016/136787 discloses a backlight devise to be used for a liquid crystal display device, as an example of an illumination device. This backlight device includes at least: a light emitting diode (LED); a chassis having a bottom plate and accommodating the LED; a wavelength conversion sheet provided toward, and spaced apart from, a light-exiting side of the LED, and including a phosphor converting a wavelength of light from the LED; and a reflective sheet reflecting the light from the LED toward the wavelength conversion sheet. Moreover, as an example, the above document discloses a coloring portion provided to the reflective sheet to create a color close to the color of the light of the LED.

SUMMARY

An illumination device and a display device according to an aspect of the present invention intend to reduce a decline in production efficiency due to an increase in the number of components.

An illumination device according to a first aspect of the present invention includes: a substrate including a first face; a wavelength conversion member facing the first face of the substrate, and converting at least a portion of a wavelength, of the light emitted from the light source, into a wavelength having a color different from a similar color of the light emitted from the light source, wherein the substrate includes a first coloring portion constituting at least a portion of the substrate, including at least a portion of the first face, and creating the similar color.

A second aspect of the present invention is directed to the illumination device according to the first aspect, wherein the light source may emit primary light in a first wavelength range, the wavelength conversion member may convert a portion of the primary light into secondary light in a second wavelength range different from the first wavelength range, and in the first coloring portion, the primary light may be higher in reflectance than the secondary light.

A third aspect of the present invention is directed to the illumination device according to the first aspect or the second aspect, wherein in the first coloring portion, the similar color may be higher in color density as more distant from the light source.

A fourth aspect of the present invention is directed to the illumination device according to any one of the first to third aspects, wherein the substrate may include: a placement portion provided with the light source; and an outer periphery portion surrounding the placement portion, the substrate may include a second coloring portion constituting at least a portion of the substrate, including at least a portion of the first face, and creating the similar color, the first coloring portion may be placed in the placement portion, the second coloring portion may be placed in the outer periphery portion, and the second coloring portion may be lower in color density of the similar color than a boundary portion included in the first coloring portion and provided along a boundary with the second coloring portion.

A fifth aspect of the present invention is directed to the illumination device according to any one of the first to fourth aspects wherein the substrate may include a light reflection layer reflecting at least a portion of incident light, and the first coloring portion may be directly provided on the light reflection layer.

A sixth aspect of the present invention is directed to the illumination device according to any one of the first to fifth aspects, wherein the light source may include a plurality of light sources, the light sources may be arranged in a first direction at first predetermined intervals and in a second direction at second predetermined intervals, the second direction intersecting with the first direction, the first coloring portion may include a plurality of dots arranged in the first direction at the first predetermined intervals and in the second direction at the second predetermined intervals, and two or more of the dots, which are adjacent to any given one target light source of the light sources, may be positioned at a predetermined distance from the one target light source.

A seventh aspect of the present invention is directed to the illumination device according to any one of the first to sixth aspects. The illumination device may include a third coloring portion creating the similar color, wherein the substrate may include: a placement portion provided with the light source; and an outer periphery portion surrounding the placement portion, and the third coloring portion may have at least a portion positioned closer to the wavelength conversion member than to the placement portion, and surrounding the placement portion.

An eighth aspect of the present invention is directed to the illumination device according to the seventh aspect, wherein the substrate may include a rising portion rising from the outer periphery portion toward the wavelength conversion member, and the third coloring portion may be placed in the rising portion.

A ninth aspect of the present invention is directed to the illumination device according to the seventh aspect or the eight aspect, wherein the third coloring portion may have at least a portion angled from the outer periphery portion toward the wavelength conversion member, and the portion of the third coloring portion may have a color density increasing from the outer periphery portion toward the wavelength conversion member.

A display device according to a tenth aspect of the present invention includes: the illumination device according to the first aspect; and a display panel modulating light emitted from the illumination device to display an image.

BRIEF DESCRIPTION OF THE DRAWINGS

FIG. 12 schematically illustrates a display device according to a fifth modification; that is, one modification of the second embodiment.

DESCRIPTION OF THE PREFERRED EMBODIMENTS

Figure 1:
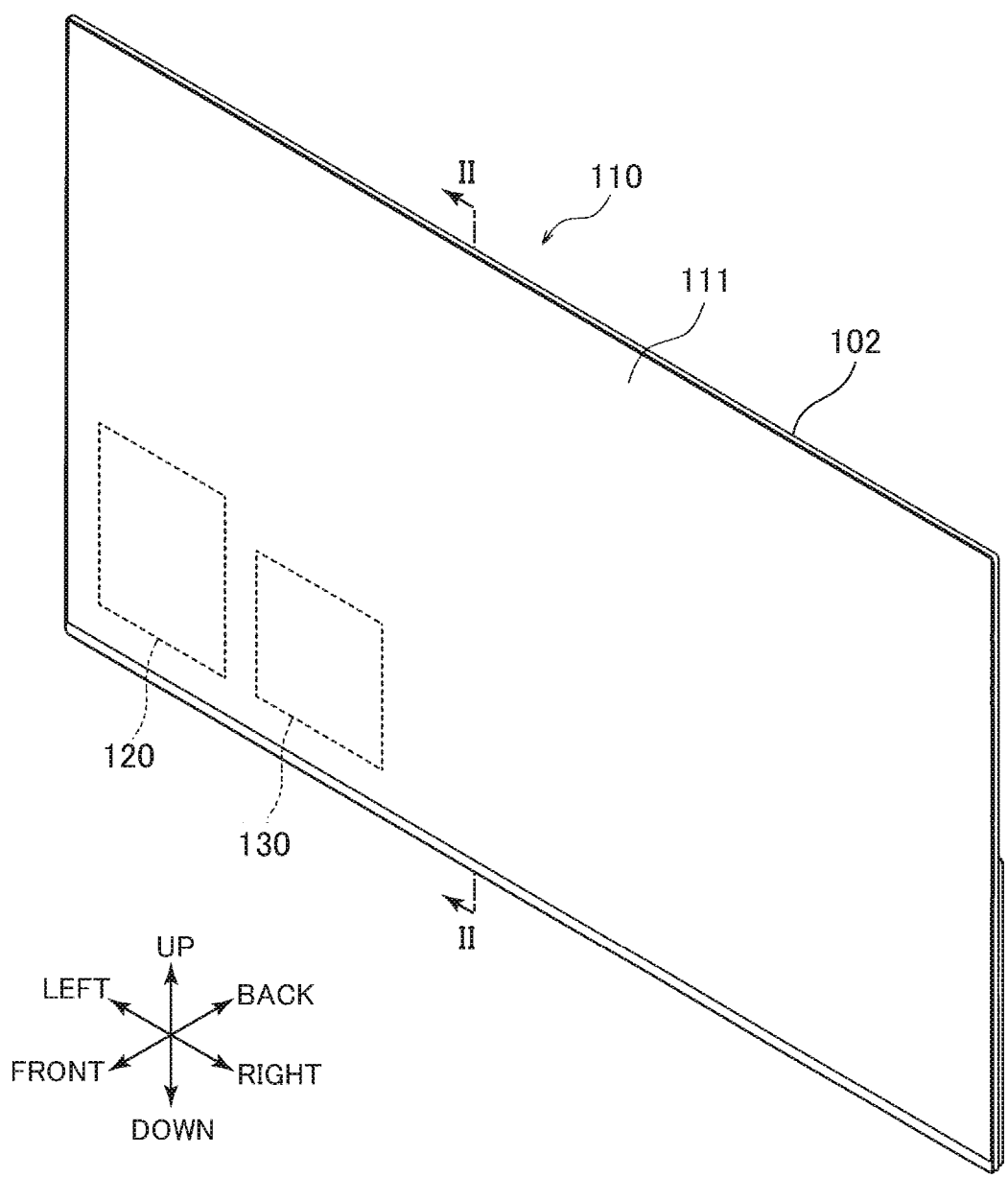
FIG. 1 schematically illustrates an example of a TV receiver including a display device according to a first embodiment.

Described below are an illumination device and a display device according to an aspect of the present invention, with reference to the drawings. In the descriptions below, directions such as front, back, left, right, up, and down are indicated by arrows in the drawings. Identical reference numerals are used to denote identical or substantially identical components throughout the drawings, and repeated descriptions thereof shall be omitted. Note that the present invention shall not be limited to the configurations of the embodiments described below, and can be modified within the technical scope of the present invention; that is, within the scope of, for example, configurations to achieve the advantageous effects of the present invention.

First Embodiment

Described below is a first embodiment of an illumination device and a display device according to one aspect of the present invention. FIG. 1 schematically illustrates an external view of a TV receiver including the illumination device and the display device according to the first embodiment. As illustrated in FIG. 1, a TV receiver 101 includes: a display device 110; a receiver 120; and a processor 130. The display device 110 includes a display surface 111 displaying an image. The TV receiver 101 includes a front cabinet 102 in the front and a not-shown rear cabinet in the back. The front cabinet 102 is a casing shaped in the form of a frame, and placed to cover a periphery of the display device 110 from the front. The rear cabinet is placed in the back of the display device 110, and covers a back face of the display device 110, the receiver 120, and the processor 130.

The TV receiver 101 is, for example, supported by a not-shown stand for installation, or hooked on a not-shown fastener and hung on a wall. Here, the display surface 111 of the display device 110 faces forward. The thickness direction, the longitudinal direction, and the transverse direction of the display device 110 respectively correspond to the fore-aft direction, the horizontal direction, and the vertical direction of the display device 110.

The receiver 120 is a circuit board on which a receiver circuit is mounted. The receiver 120 receives a TV broadcast from the outside through a not-shown antenna, and outputs a broadcast signal based on the received TV broadcast.

The processor 130 is a circuit board on which such circuits as a signal processing circuit and a display controlling circuit are mounted. The signal processor 130 provides predetermined processing on a broadcast signal output from the receiver 120 to output image data. Moreover, the processor 130 causes a display panel 201 and a backlight 202 (see FIG. 2) of the display device 110 to display an image based on the image data on the display surface 111 of the display device 110. The display panel 201 and the backlight 202 will be described later.

Configuration of Display Device

Figure 2:
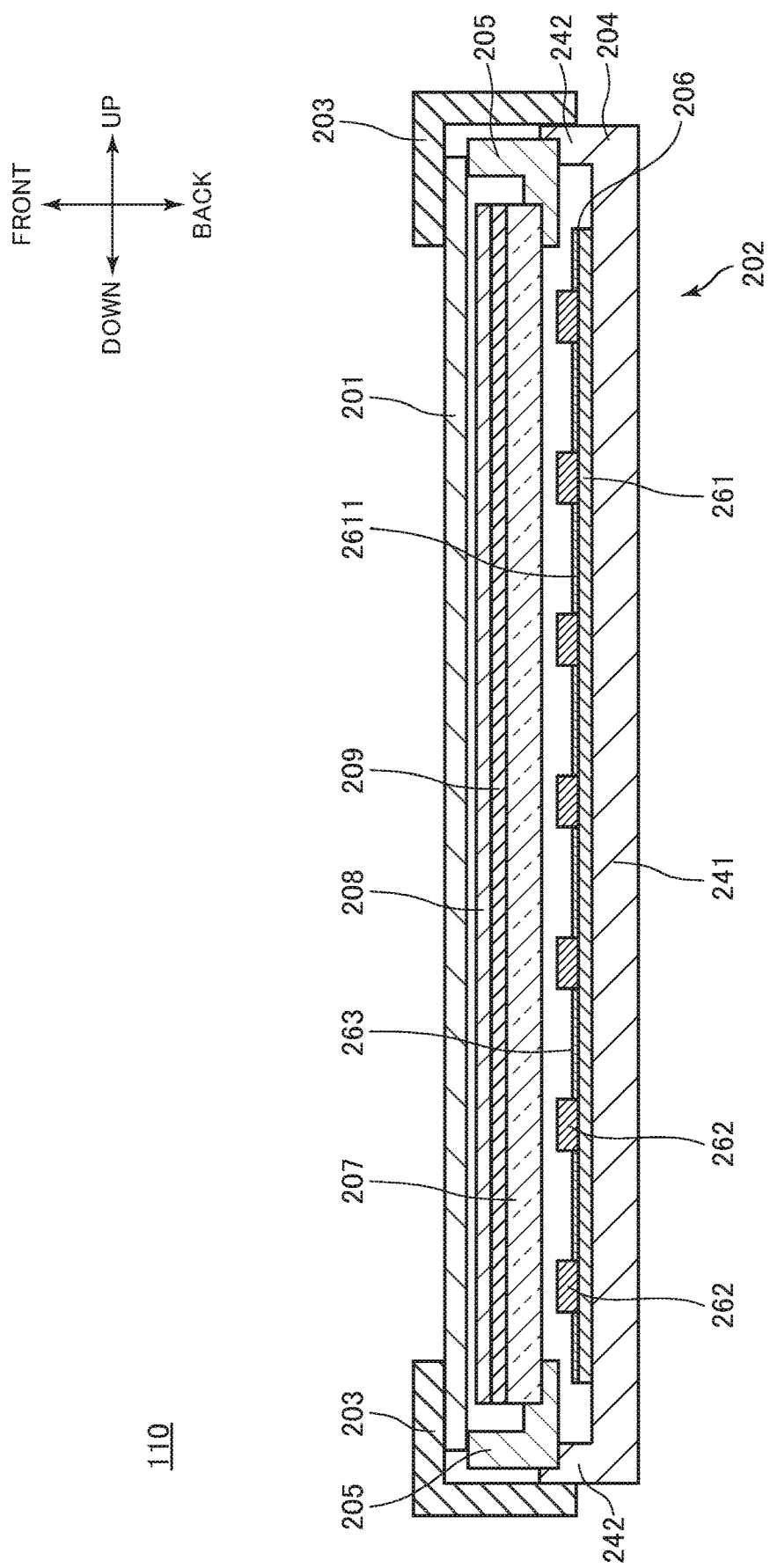
FIG. 2 schematically illustrates a display device according to the first embodiment.

FIG. 2 is a cross-sectional view schematically illustrating an example of the display device 110. The display device 110 includes at least: the display panel 201; and the backlight 202. Note that, in the example illustrated in FIG. 2, the display device 110 includes a bezel 203 fastening the display panel 201 to the backlight 202.

The display panel 201 modulates light emitted from the backlight 202 to display an image on the display surface 111 (see FIG. 1). For example, the display panel 201 includes: a liquid crystal panel; and a pair of deflector plates arranged to sandwich fore and aft the liquid crystal panel therebetween. The display panel 201 has an external shape formed into a substantial rectangle in a planar view in a fore-aft direction. The liquid crystal panel includes: a color filter substrate provided with a color filter; an array substrate provided with a TFT array; and a liquid crystal layer placed between a pair of the substrates.

The bezel 203 is a member shaped into a frame surrounding vertical and horizontal peripheries of the display panel 201. The bezel 203 is attached to a chasses 204 to be described later from, for example, the front of the display panel 201.

Configuration of Backlight

In the example illustrated in FIG. 2, the backlight 202 includes: the chassis 204; a frame 205; a light source device 206; a diffusion plate 207; an optical sheet group 208; and a wavelength conversion sheet 209. Note that the backlight 202 is one embodiment of the illumination device according to an aspect of the present invention, and includes at least: the light source device 206; and the wavelength conversion sheet 209. The backlight 202 is placed in back of the display panel 201. The light exiting forward from the light source device 206 of the backlight 202 passes through the diffusion plate 207, the optical sheet group 208, and the wavelength conversion sheet 209, and illuminates the display panel 201 as illuminating light.

The chassis 204 is a casing shaped into a substantial box opening forward, and supports the members included in the backlight 202. The chassis 204 includes: a bottom 241; and a side 242. The bottom 241 is shaped into a rectangular plate whose horizontal direction and vertical direction respectively correspond to the longitudinal direction and the transverse direction of the bottom 241. The bottom 241 has a front face provided with the light source device 206. The side 242 rises forward from an outer periphery of the bottom 241, and surrounds the front face of the bottom 241.

The frame 205 is, for example, a member shaped into a frame along outer peripheries of the display panel 201 and the optical sheet group 208. The frame 205 and the bezel 203 sandwich therebetween, and hold, the display panel 201. Moreover, the frame 205 holds the diffusion plate 207, the optical sheet group 208, and the wavelength conversion sheet 209.

The light source device 206 includes: a substrate 261; and a plurality of LED light sources 262, and emits the light forward. The substrate 261 includes a coloring portion 263 to be described later. The substrate 261 is placed on the front face of the bottom 241. The LED light sources 262 are mounted on the front face of the substrate 261, and emit light in a predetermined color. That is, the LED light sources 262 emit light with a part of the wavelength range in a visible range. As an example, the LED light sources 262 in this embodiment emit monochromatic light in blue (blue light). Note that the blue light is visible light having a specific wavelength range (e.g., approximately ranging from 420 nm to 500 nm) which belongs to blue. The light source device 206 will be described later.

The diffusion plate 207 is an example of a light diffusion member, and is capable of diffusing the passing light. For example, the diffusion plate 207 is made of a substantially transparent resin base material, and shaped into a rectangular plate. In the base material, a large number of diffusing particles are dispersed. The diffusion plate 207 has a periphery supported by the frame 205, and is placed in front of the light source device 206.

The optical sheet group 208 includes a plurality of optical sheets stacked together and placed in front of the diffusion plate 207. Examples of the optical sheets include microlens sheets, prism sheets, reflective polarizing sheets, diffusion sheets, and anti-reflective sheets. Note that, instead of the optical sheet group 208 including the plurality of optical sheets, one optical sheet may be placed.

The wavelength conversion sheet 209 is an example of a wavelength conversion member, and converts at least a portion of a wavelength, of the light emitted from the LED light sources 262, into a wavelength different from a wavelength in a similar color to a color of the light emitted from the LED light sources 262. In other words, the wavelength conversion sheet 209 converts at least a portion of light in a first wavelength range (primary light) emitted from the LED light sources 262 into light in a second wavelength range (secondary light) different from the first wavelength range. Note that the similar color is the same color as, or a color closely represented in a hue circle as, the color of the light emitted from the LED light sources 262.

The wavelength conversion sheet 209 includes, for example: a phosphor layer (a wavelength conversion layer) containing a phosphor (a wavelength conversion material) for converting a wavelength of the blue light (the primary light) from the LED light sources 262; and a pair of protective layers sandwiching therebetween the phosphor layer in the fore-aft direction and protecting the phosphor layer. Dispersed and contained in the phosphor layer is a yellow phosphor emitting yellow light (the secondary light), using the blue monochromatic light from the LED light sources 262 as excitation light. Note that the yellow light is visible light having a specific wavelength range (e.g., approximately ranging from 570 nm to 600 nm) which belongs to yellow.

The wavelength conversion sheet 209 is placed toward, and across from, a front face 2611 (a first face) of the substrate 261. In the example illustrated in FIG. 2, the wavelength conversion sheet 209 is placed in front of the diffusion plate 207 and in back of the optical sheet group 208. That is, the wavelength conversion sheet 209 is placed across the substrate 261 of the light source device 206 from the diffusion plate 207. Note that the wavelength conversion sheet 209 may be placed in front of the optical sheet group 208 and in back of the diffusion plate 207.

The wavelength conversion sheet 209 converts a portion of the primary light (the blue light) emitted from the LED light sources 262 into the secondary light (the yellow light). Another portion of the primary light emitted from the LED light sources 262 and the secondary light act as illuminating light to illuminate the display panel 201. Here, a wavelength conversion efficiency of the wavelength conversion sheet 209 is appropriately adjusted so that a ratio of the primary light to the secondary light in the illuminating light is adjusted. For example, the ratio of the primary light to the secondary light is appropriately adjusted so that white illuminating light is obtained.

Note that dispersed and contained in the phosphor layer may be a red phosphor emitting red light and a green phosphor emitting green light, based on the blue monochromatic light as excitation light. For example, the red light is visible light having a specific wavelength range (e.g., approximately ranging from 600 nm to 780 nm) which belongs to red. Moreover, for example, the green light is visible light having a specific wavelength range (e.g., approximately ranging from 500 nm to 570 nm) which belongs to green.

Configuration of Light Source Device

Figure 3:
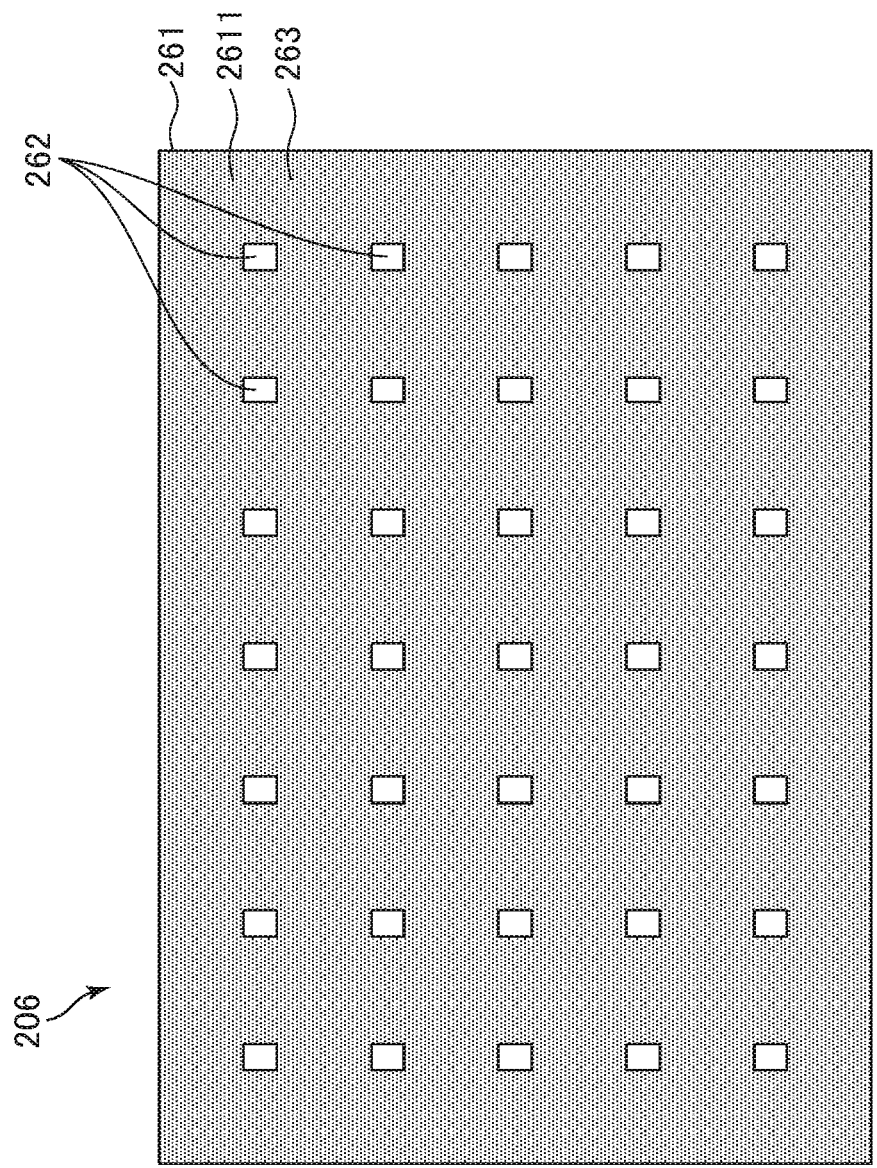
FIG. 3 schematically illustrates a light source device according to the first embodiment.

FIG. 3 schematically illustrates the light source device 206 observed from the front. In the example illustrated in FIG. 3, the substrate 261 is, for example, shaped into a rectangle such that the direction or the vertical direction of the rectangle is determined as a longitudinal direction. The substrate 261 is placed on the bottom 241 (see FIG. 2) so that the longitudinal direction and the transverse direction of the substrate 261 respectively correspond to the horizontal direction and the vertical direction of the substrate 261. Note that the substrate 261 may include a plurality of substrates.

The LED light sources 262 are arranged on the front face of the substrate 261 horizontally and vertically in a matrix. Each of the LED light sources 262 has an optical axis in the fore-aft direction. Note that the "optical axis" aligns with a traveling direction of light having the highest emission intensity (the peak) of the light emitted from the LED light sources 262.

The amount of light emitted from each LED light source 262 is adjusted by the processor 130. Note that the LED light sources 262 may be grouped by sub-regions into which the substrate 261 is divided into when observed from the front, and the amount of light emitted from the LED light sources 262 may be adjusted for each group. Moreover, each of the LED light sources 262 may include LEDs alone, or a lens modulating the light emitting from the LED.

The coloring portion 263, corresponding to a first coloring portion, constitutes at least a portion of the substrate 261, and includes at least a portion of the front face (the first face) 2611 of the substrate 261 (see FIG. 2). The coloring portion 263 is formed directly on a face of a base material included in the substrate 261.

The coloring portion 263 creates a color similar to that of the light emitted from the LED light sources 262. In the coloring portion 263, the primary light emitted at least from the LED light sources 262 is higher in reflectance than the secondary light whose wavelength is converted by the wavelength conversion sheet 209. In other words, in the coloring portion 263, a light absorbance of the secondary light whose wavelength is converted by the wavelength conversion sheet is higher than a light absorbance of the primary light emitted at least from the LED light sources 262. As seen in this embodiment, in the case where the wavelength conversion sheet 209 for converting the blue primary light into the yellow secondary light is used, the coloring portion 263 has a reflectance higher in the blue light than in the yellow light.

In this embodiment, the coloring portion 263 creates a color of the primary light emitted from the LED light sources 262; namely, blue. In the coloring portion 263, a light absorbance of a light in a wavelength range which belongs to a color other than blue in the visible light range is higher than the light absorbance of light (the blue light) in the wavelength range which belongs to blue that is the color of the primary light emitted at least from the LED light sources 262. In other words, in the coloring portion 263, a reflectance of blue light is higher than a reflectance of light in the wavelength range which belongs to a color other than blue in the visible light range. For example, the coloring portion 263 is made of, for example, a coating colored in blue and a resist material containing a blue pigment or a blue dye applied to the front face of the substrate 261. Hence, the coloring portion 263 is formed directly on the front face of the substrate 261.

Note that used may be a wavelength conversion sheet converting the primary light in blue into the secondary light in red and green. In such a case, at least, the coloring portion 263 has a reflectance higher in blue light than in light in a wavelength range which belongs to red and green.

Figure 4:
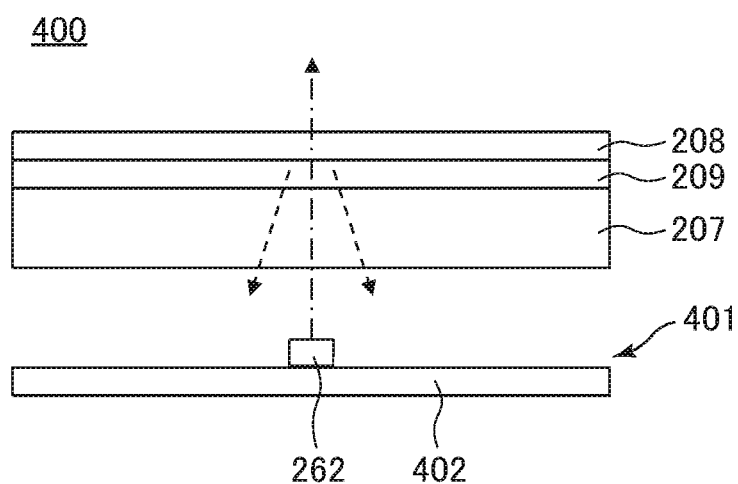
FIG. 4 schematically illustrates a backlight according to a comparative example.

FIG. 4 schematically illustrates a backlight (an illumination device) 400 without the coloring portion 263 according to a comparative example. The backlight 400 illustrated in FIG. 4 includes: a light source device 401; the diffusion plate 207; the optical sheet group 208; and the wavelength conversion sheet 209. The backlight 400 is different from the backlight 202 according to this embodiment in that the substrate 402 of the light source device 401 does not include the coloring portion 263. Here, at least a portion of light emitted from the LEDs and coming back from the wavelength conversion sheet toward the LEDs could enter the wavelength conversion sheet again, such that the wavelength of the entering light would be converted. Hence, if the light emitted from the LED light sources 262 passes through the wavelength conversion sheet 209 twice or more, the illuminating light of the backlight could be uneven in color.

Specifically, for example, when the light source device 401 of the backlight 400 illustrated in FIG. 4 emits the primary light (illustrated in a dot-dash line in FIG. 4) forward, a portion of the primary light is converted by the wavelength conversion sheet 209 into the secondary light. A portion of the primary light not converted and a portion of the secondary light would not be emitted toward the display panel 201, possibly generating return light (illustrated in a dashed line in FIG. 4) traveling toward the light source device 401 (backward). Examples of the return light include scattering light inside the wavelength conversion sheet 209, and reflected light and scattering light generated after the emitted light passes through the wavelength conversion sheet 209. When the return light is, for example, reflected off the substrate 261 toward the display panel 201, and passes through the wavelength conversion sheet 209 again, a portion of the primary light is converted into the secondary light. Hence, the amount of the primary light decreases while the amount of the secondary light increases. Hence, when the ratio of the secondary light (the yellow light) to the primary light (the blue light) exceeds a desired ratio, for example, the illuminating light appears yellowish. In a planar view in the fore-aft direction, a partial change in the ratio of the secondary light (the yellow light) to the primary light (the blue light) might cause the risk of visible color unevenness.

Figure 5:
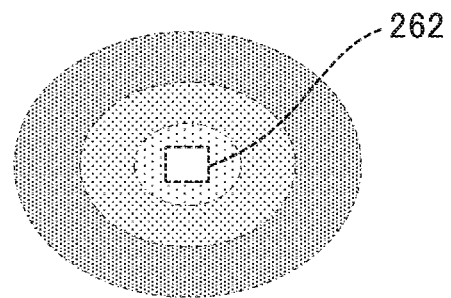
FIG. 5 schematically illustrates an example of uneven color which could appear in the backlight illustrated in FIG. 4.

FIG. 5 schematically illustrates an example of uneven color which could appear in the backlight 400 illustrated in FIG. 4 as an example. FIG. 5 shows an example of a part of the backlight 400 when observed from the front. In the illustration, a region with a higher dot density appears more yellowish. As illustrated in FIG. 5, for example, the illuminating light is unevenly colored more yellowish as the illuminating light travels farther away from the LED light sources 26. In the local dimming of the LED light sources 262, for example, the uneven color is likely to be visible in front of an LED light source 262 larger in emitted amount of light than LED light sources 262 provided around the LED light source 262.

In this embodiment, the coloring portion 263 absorbs the yellow light more than the blue light out of the light generated by backscattering on the wavelength conversion sheet 209. Hence, the return light generated by the backscattering on the wavelength conversion sheet 209 turns bluish by the coloring portion 263. The return light is kept from re-entering the wavelength conversion sheet 209, making it possible to reduce the color unevenness.

Moreover, the coloring portion 263 is included in the substrate 261; that is, the coloring portion 263 is directly formed on the substrate 261. Such a feature makes it possible to reduce the number of components, compared with a case where the coloring portion 263 is provided to another member placed on the front face of the substrate 261, thus contributing to an improvement in production efficiency. For example, the coloring portion 263 would be provided to a base material such as a reflective sheet placed along the front face of the substrate 261. In this case, the production efficiency could decline because of, for example, an increase in the number of components because of the provided base material and positioning of the base material in relation to the substrate 261. In this embodiment, the coloring portion 263 is directly formed on the substrate 261, making it possible to reduce a decline in the production efficiency.

Moreover, in the case where the coloring portion 263 is formed on a sheet of base material as described above, the sheet might partially delaminate upward from the substrate 261 to develop such troubles as blocking a portion of the light from the LED light sources 262, and interfering with another member, such as the wavelength conversion sheet 209, provided in front of the substrate 261. In this embodiment, the coloring portion 263 is directly formed on the substrate 261 without the sheet. Such a feature makes it possible to reduce the risk of the troubles caused by the sheet delaminating upward.

Moreover, in the backlight 202 according to this embodiment, the coloring portion 263 is directly formed on the substrate 261. Compared with a case where the coloring portion 263 is provided on another member placed on the front face of the substrate 261, such a feature makes it possible to reduce a distance (an optical distance) between an optical member (the diffusion plate 207 in this embodiment) and the light source deice 206 arranged in front of the substrate 261. As can be seen, compared with the case where the coloring portion 263 is provided on another member placed in front of the substrate 261, the backlight 202 according to this embodiment easily obtains a higher brightness by an increase in density of the LED light sources 262 and a reduction in the optical distance.

Modifications of First Embodiment: First Modification

Figure 6:
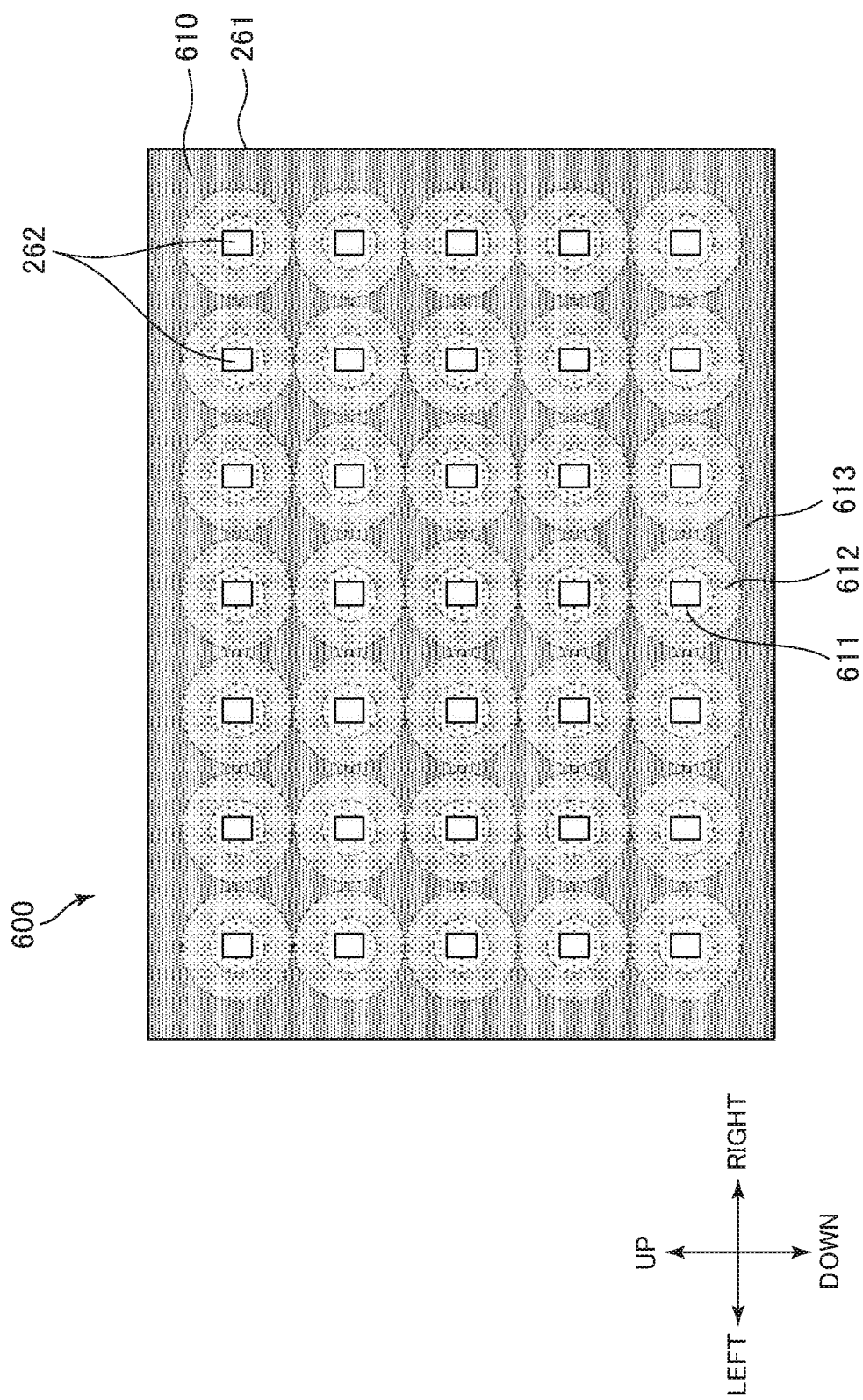
FIG. 6 schematically illustrates a light source device according to a first modification; that is, one modification of the first embodiment.

FIG. 6 illustrates a schematic configuration of a light source device, observed from the front, according to a first modification; that is, one modification of the first embodiment. Note that, in the description below, features similar to those in the first embodiment will not be elaborated upon. The first modification is different from the first embodiment in that the color density of the coloring portion varies depending on the distance from the LED light sources 262.

In the example illustrated in FIG. 6, a light source device 600 includes a coloring portion 610 in which a color similar to that of the primary light from the LED light sources 262 is higher in color density as more distant from the LED light sources 262. In the coloring portion 610, the reflectance of the secondary light decreases as, for example, the reflectance of the primary light from the LED light sources 262 is substantially constant and the distance from the LED light sources 262 increases. Note that the distance from the LED light sources 262 means, for example, that a distance between any given point on the front face of the substrate 261 and a center (e.g., an optical axis) of a LED light source 262 closest to the given point.

As can be seen, when no coloring portion is provided, the rate of the secondary light to the primary light in the illuminating light is larger as the distance from the LED light sources 262 is greater when viewed from the front (see FIG. 5). In contrast, in the coloring portion 610, the light absorbance of the secondary light with respect to the primary light rises (the reflectance is smaller) as the above distance increases. Hence, even if the distance from the LED light sources 262 increases, the coloring portion 610 can reduce a rise in the rate of the secondary light to the primary light, making it possible to keep color unevenness from appearing.

Moreover, in the coloring portion 610, the reflectance of the secondary light decreases as the distance increases from the LED light sources 262 when viewed from the front. As can be seen, the color density of the coloring portion 610 is changed, depending on the distance from the LED light sources 262. Compared with a case where the color density of the coloring portion 610 remains constant, such a feature makes it possible to curb a decrease in the amount of illuminating light emitted from the backlight. That is, the backlight according to the first modification can curb a decrease in the amount of the illuminating light while keeping color unevenness from appearing.

In the example illustrated in FIG. 6, the coloring portion 610 includes: a first region 611 around each of the LED light sources 262; a second region 612 around the first region 611; and a third region 613 around the second region 612. The color density of the coloring portion 610 increases in stages in the order of the first region 611, the second region 612, and the third region 613. That is, the color density of the coloring portion 610 is substantially constant in each of the first region 611, the second region 612, and the third region 613. The coloring portion 610 is formed by application of a coating having a predetermined color density for each of the regions. Compared with a case where a color density continuously changes, the color density of the coloring portion 610 changes in stages, facilitating the formation of the coloring portion 610.

Note that, in the example in FIG. 6, the coloring portion 610 includes three regions each having a different color density, depending on the distance from the LED light sources 262. Alternatively, the coloring portion 610 may include two regions, or four or more regions. Moreover, in the example in FIG. 6, the color density of the coloring portion 610 increases in stages as the distance from the LED light sources 262 increases. Alternatively, the color density of the coloring portion 610 may continuously increase.

Modifications of First Embodiment: Second Modification

Figure 7:
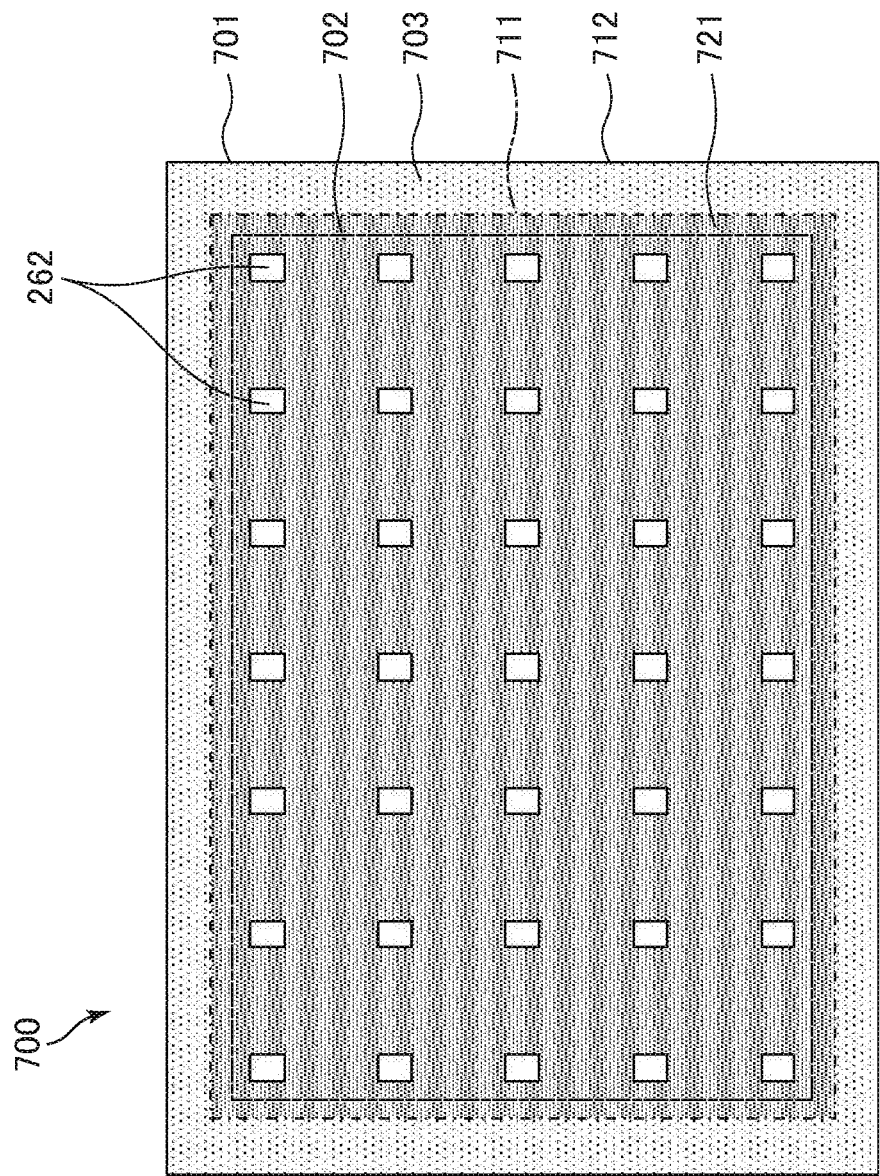
FIG. 7 schematically illustrates a light source device according to a second modification; that is, one modification of the first embodiment.

FIG. 7 schematically illustrates a light source device according to a second modification; that is, one modification of the first embodiment. The second modification is different from the first embodiment in that: a coloring portion includes a first coloring portion around the LED light sources 262, and a second coloring portion surrounding the first coloring portion; and the second coloring portion is lower in color density than a boundary of the first coloring portion with the second coloring portion.

In an example illustrated in FIG. 7, a substrate 701 of a light source 700 includes a first coloring portion 702; and a second coloring portion 703. Similar to the coloring portion 263 of the first embodiment, the first coloring portion 702 and the second coloring portion 703 create a color similar to that of the primary light of the LED light sources 262. Here, the substrate 701 includes: a placement portion 711 provided with the LED light sources 262; and an outer periphery portion 712 surrounding the placement portion 711.

The first coloring portion 702 is placed in the placement portion 711. The first coloring portion 702 includes a boundary portion 721 provided along a boundary with the second coloring portion 703. The boundary portion 721 is an outer periphery of the first coloring portion 702. In FIG. 7, for example, the boundary portion 721 is a looped region defined between dot-dash lines.

The second coloring portion 703 is placed in the outer periphery portion 712. The second coloring portion 703 is lower in color density than the boundary portion 721 of the first coloring portion 701. In other words, in the boundary between the first coloring portion 702 and the second coloring portion 703, the color density is lower toward the second coloring portion 703 than toward the first coloring portion 702. For example, in the above boundary, the reflectance of the primary light from the LED light sources 262 is substantially uniform, and the reflectance of the secondary light increases from the first coloring portion 702 toward the second coloring portion 703. As a result, a reflectance of the light can increase in the outer periphery 712 in which no LED light sources 262 are provided. Such a feature makes it possible to curb a decrease in the amount of the illuminating light at the outer periphery of the backlight when viewed from the front.

Note that, in the example illustrated in FIG. 7, the color density of the second coloring portion 702 remains substantially constant. Alternatively, the color density of the second coloring portion 703 does not have to remain constant. For example, the color density of the second coloring portion 703 may decrease as the distance from the first coloring portion 702 increases. More specifically, for example, in the second coloring portion 703, the reflectance of the primary light may be substantially constant, and the reflectance of the secondary light may increase as the distance from the first coloring portion 702 increases. Such a feature makes it possible to narrow the difference in the reflectance of the secondary light between the first coloring portion 702 and the second coloring portion 703, across the boundary between the first coloring portion 702 and the second coloring portion 703. Hence, the color unevenness due to the difference in reflectance can be kept from appearing.

Furthermore, in the example illustrated in FIG. 7, the color density of the first coloring portion 702 remains substantially constant. Alternatively, the color density of the first coloring portion 702 does not have to remain constant. For example, if the first coloring portion 702 is similar in color density distribution to the first modification illustrated in FIG. 6, the color density of the boundary portion 721 is that of the third region 613 illustrated in FIG. 6. In this case, the color density of the second coloring portion 703 is below the highest color density of the first coloring portion 702.

Modifications of First Embodiment: Third Modification

Figure 8:
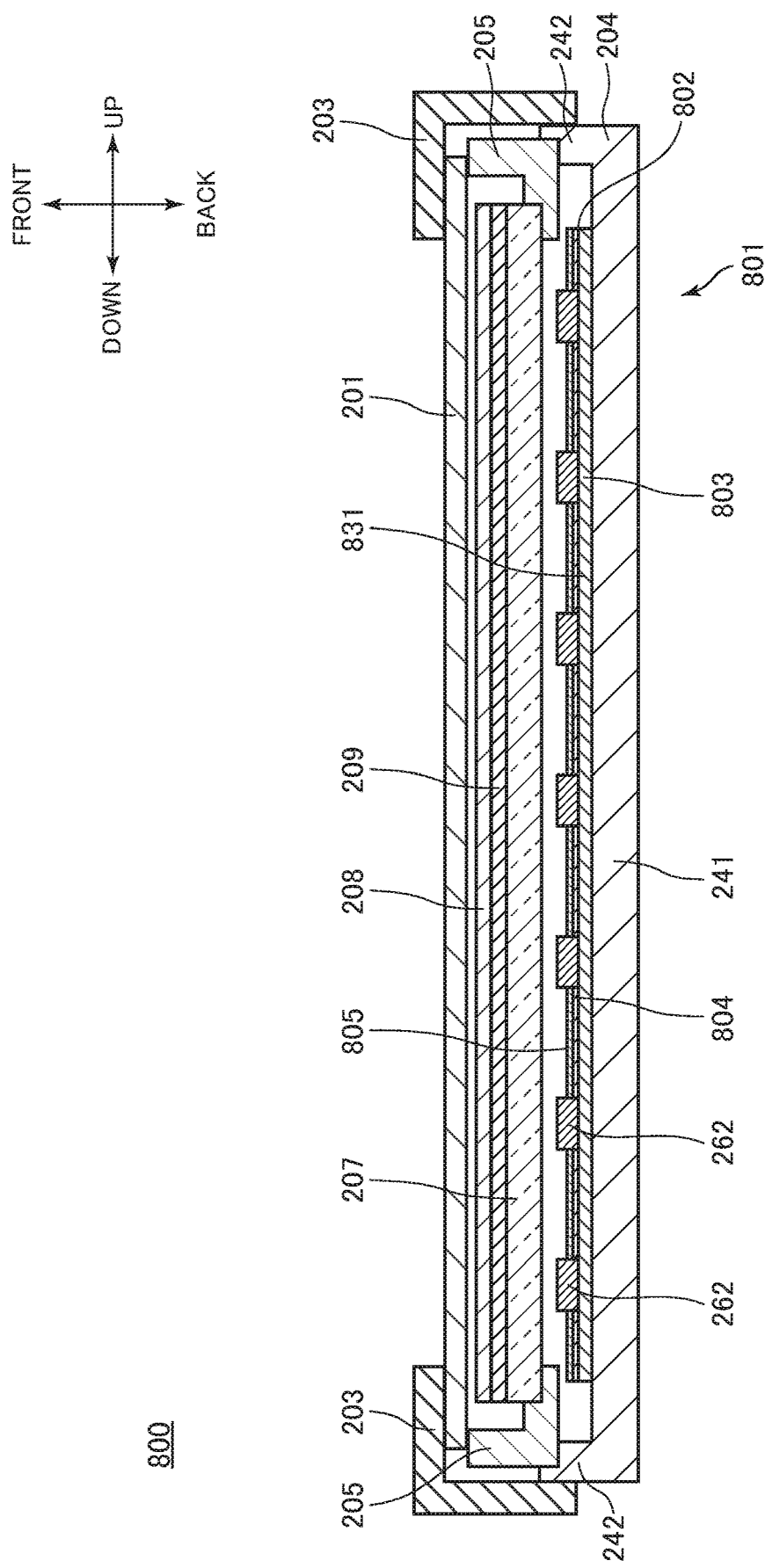
FIG. 8 schematically illustrates a display device according to a third modification; that is, one modification of the first embodiment.

FIG. 8 schematically illustrates a display device according to a third modification; that is, one modification of the first embodiment. The third modification is different from the first embodiment in that a substrate includes a light reflection layer, and the light reflection layer includes a coloring portion.

In an example illustrated in FIG. 8, a display device 800 includes a backlight 801. The backlight 801 includes a light source device 802. The light source device 802 includes a substrate 803. The substrate 803 includes a light reflection layer 804 and a coloring portion 805.

The light reflection layer 804 is formed on a front face of a base material 831 of the substrate 803, and reflects light having a wavelength range in at least a visible light range. The light reflection layer 804 is formed of, for example, a resist material and a coating including such a high-reflective material as a white pigment. Note that the light reflection layer 804 may be formed on a face of the substrate 803 other than the front face, such as a back face, or a side face, of the substrate 803.

Similar to the coloring portion 263 of the first embodiment, the coloring portion 805 creates a color similar to that of the primary light emitted from the LED light sources 262. The coloring portion 805 is directly provided on the front face of the light reflection layer 804. Alternatively, the coloring portion 805 is provided on at least a portion of the front face of the light reflection layer 804. For example, the coloring portion 805 is formed of a plurality of dots (halftone dots) having a color similar to that of the primary light, and dispersedly arranged on the front face of the light reflection layer 804. A color density of the coloring portion 805 can be adjusted through adjustment of the size and the number of the dots; that is, through adjustment of dot occupancy. The light reflection layer 804 is provided below the coloring portion 805. Compared with a case where no light reflection layer 804 is provided, such a feature makes it possible to increase the reflectance of the light on the substrate 803, and curb a decrease in the amount of illuminating light emitted from the backlight 801.

In the third modification, as an example, the coloring portion 805 is configured in a similar manner as the coloring portion 263 of the first embodiment is. Alternatively, the coloring portion 805 may adopt the configuration of the coloring portion described either in the first modification, or in the second modification.

Modifications of First Embodiment: Fourth Modification

Figure 9:
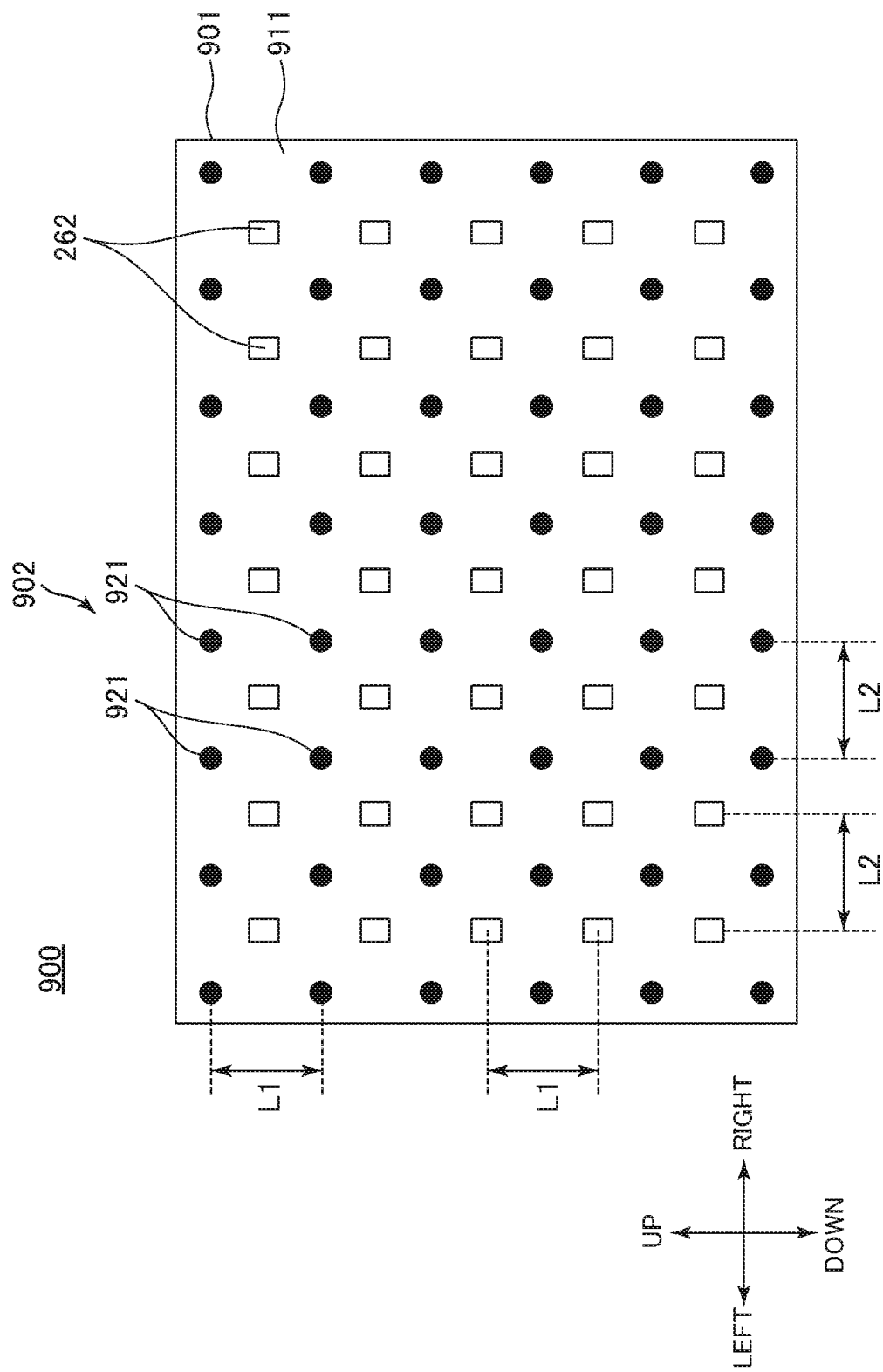
FIG. 9 schematically illustrates a light source device according to a fourth modification; that is, one modification of the first embodiment.

FIG. 9 schematically illustrates a light source device according to a fourth modification; that is, one modification of the first embodiment. The fourth modification is different from the first embodiment in that a coloring portion includes a plurality of dots formed on a substrate.

In an example illustrated in FIG. 9, a light source device 900 includes a substrate 901 including a light reflection layer 911 and a coloring portion 902. The light reflection layer 911 is configured in a similar manner as the light reflection layer 804 in the third modification is. The substrate 901 has a front face provided with the LED light sources 262 arranged vertically at first predetermined intervals L1 and horizontally at second predetermined intervals L2. That is, the LED light sources 262 are vertically and horizontally arranged in a matrix.

The coloring portion 902, which corresponds to a first coloring portion, is a dot pattern including a plurality of dots 921. The dots 921 are arranged vertically (in a first direction) at the first predetermined intervals L1 and horizontally (a second direction intersecting with the first direction) at the second predetermined intervals L2. That is, in a similar manner as the LED light sources 262, the dots 921 are vertically and horizontally arranged in a matrix.

Two or more of the dots 921, which are adjacent to any given one of the LED light sources 262 (any given one target light source), are positioned at a predetermined distance from the one target LED light source 262. That is, two or more LED light sources 262 adjacent to any given one of the dots 921 are positioned at a predetermined distance from the one dot 921.

In other words, the one dot 921 is placed in the center of a rectangular region surrounded by two of the LED light sources 262 adjacent vertically (in the first direction) to each other, and other two of the LED light sources 262 each adjacent horizontally (in the second direction) to a corresponding one of the two LED light sources 262.

In the example illustrated in FIG. 9, four of the LED light sources 262 are arranged adjacently for each of the dots 921. That is, each dot 921 is placed in the center of a region surrounded by the four LED light sources 262. Such a feature allows each of the dots 921 to achieve an advantage of uniform reduction in color unevenness of the four LED light sources 262 surrounding the dot 921.

Note that the examples of the arrangement, the shape, and the size of the dots 921 shall not be limited to those of the dot patterns of the coloring portion 902 illustrated in FIG. 9. For example, the shape of the dots 921 shall not be limited to be circular. Alternatively, the shape may be oval, polygonal in various kinds, or formed in any given shape.

Moreover, the dots 921 do not have to be arranged in a matrix. Alternatively, the dots 921 may be arranged appropriately among the LED light sources 262. For example, the dots 921 may be arranged to be rotationally symmetric with respect to each of the LED light sources 262. Such a feature makes it possible to reduce color unevenness for each of the LED light sources 262, contributing to appropriate reduction in appearance of the color unevenness even if, for example, the amount of light from the LED light sources 262 is individually adjustable.

Second Embodiment

Figure 10:
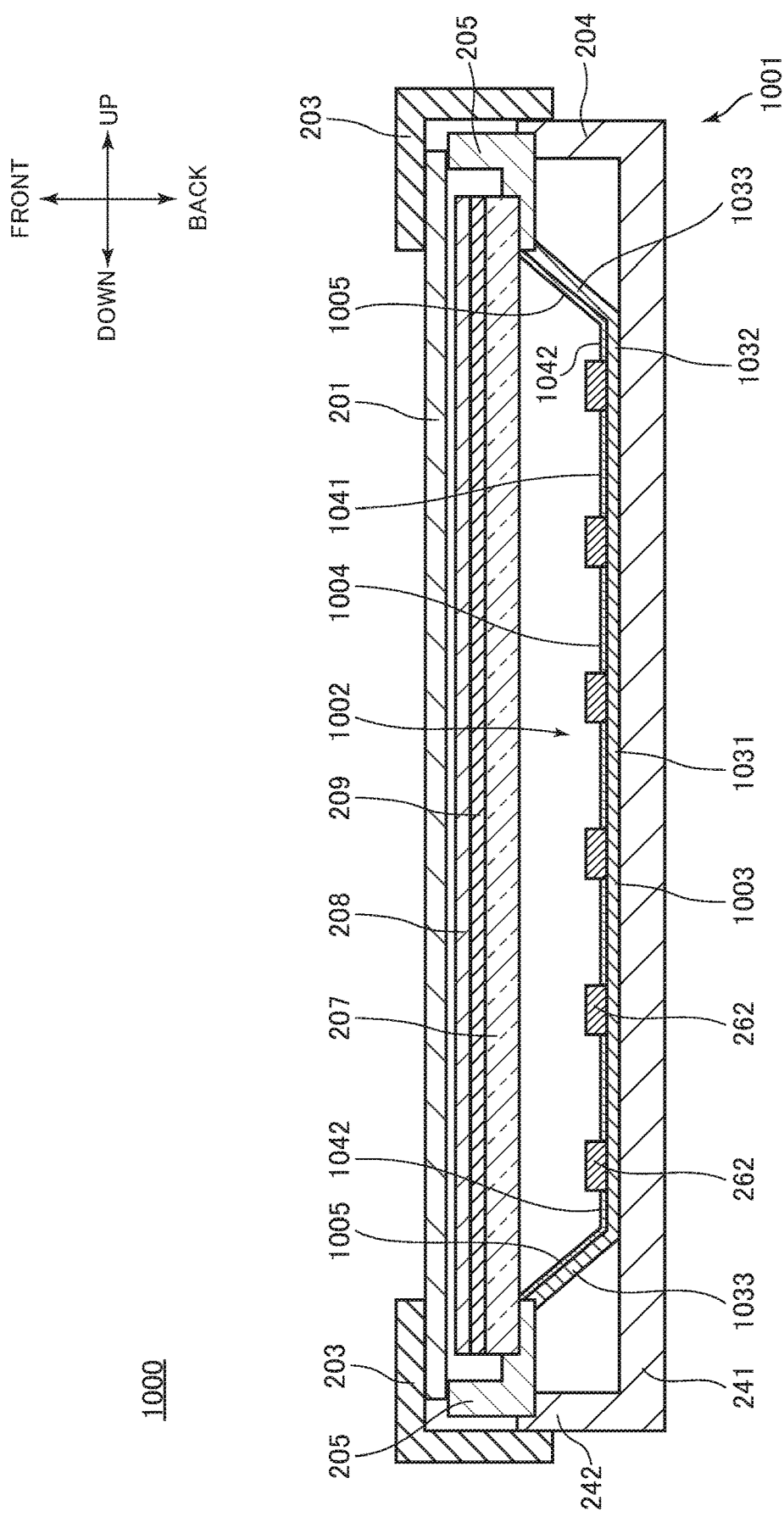
FIG. 10 schematically illustrates a display device according to a second embodiment.
Figure 11:
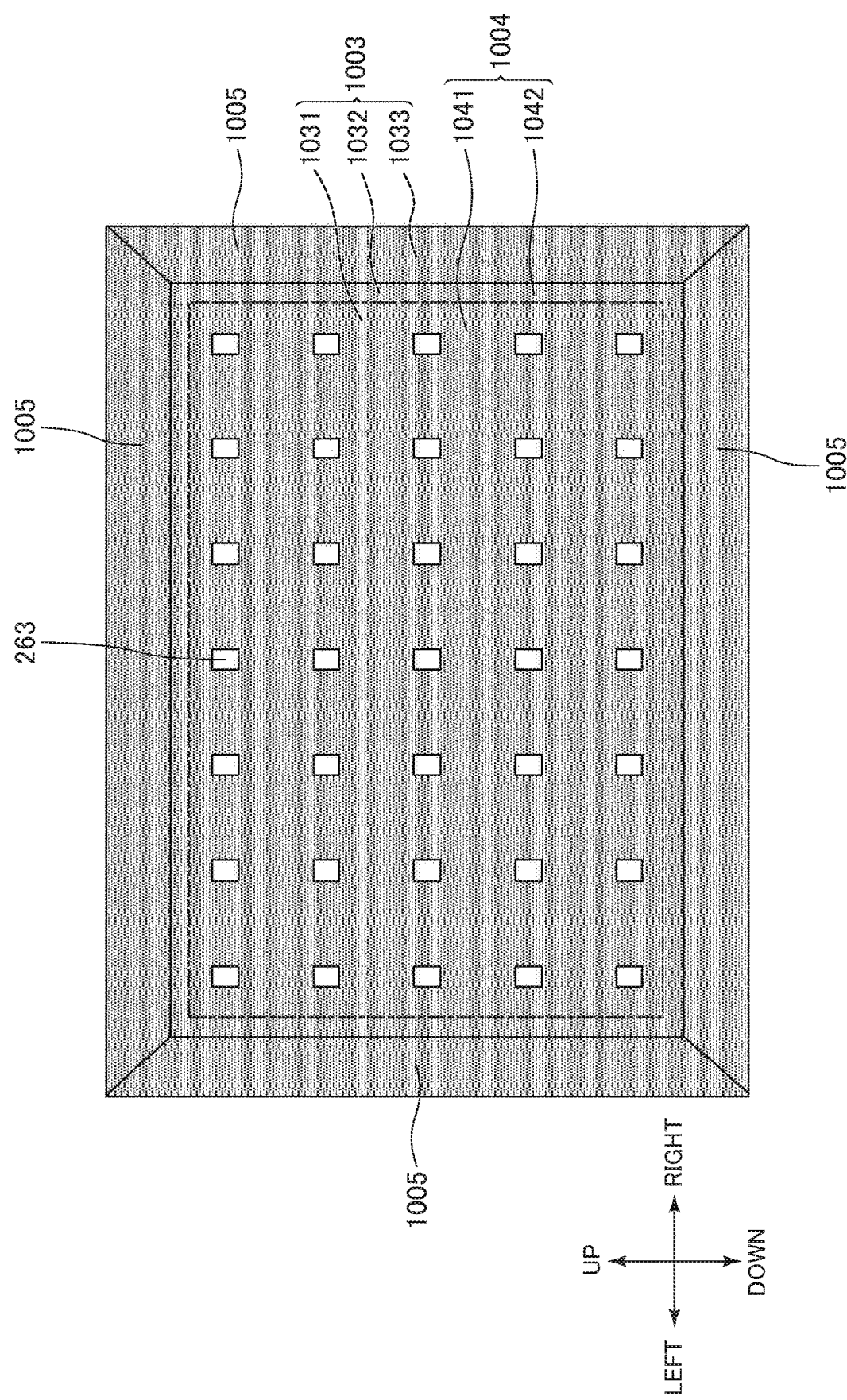
FIG. 11 schematically illustrates a light source device according to the second embodiment.

FIG. 10 schematically illustrates a display device according to a second embodiment. FIG. 11 schematically illustrates a light source device included in the display device according to the second embodiment. The second embodiment is different from the first embodiment in that a third coloring portion is provided to an outer periphery portion of a substrate to surround a placement portion provided with a light source.

In an example in FIG. 10, a display device 1000 includes a backlight 1001. The backlight 1001 includes: a chassis 204; a frame 205; a diffusion plate 207; an optical sheet group 208; a wavelength conversion sheet 209; and a light source device 1002. The light source device 1002 includes: the LED light sources 262; and a substrate 1003. The substrate 1003 includes: a coloring portion 1004; and a side coloring portion 1005.

The substrate 1003 includes: a placement portion 1031 on which the LED light sources 262 are provided; an outer periphery portion 1032 around the placement portion 1031; and a rising portion rising from the outer periphery portion 1032 toward the wavelength conversion sheet 209. As illustrated in FIG. 10, the rising portion 1033 is angled from the outer periphery portion 1032 toward the wavelength conversion sheet 209. The rising portion 1033 is provided to each of the vertical and horizontal ends of the substrate 1003.

The coloring portion 1004 is provided to a placement portion 1031 and the outer periphery 1032. The coloring portion 1004 can adopt the configuration of the coloring portion described in the first embodiment and its modifications as an example. In an example illustrated in FIGS. 10 and 11, the coloring portion 1004 includes: a first coloring portion 1041 placed in the placement portion 1031; and a second coloring portion 1042 placed in the outer periphery portion 1032. The first coloring portion 1041 is configured in a similar manner as, for example, the first coloring portion described in the first embodiment and the second modification. The second coloring portion 1042 is configured in a similar manner as, for example, the second coloring portion described in the first embodiment and the second modification. Note that the second embodiment may be different from the first embodiment in that the second coloring portion 1042 may be higher in color density than the first coloring portion 1041.

The side coloring portion 1005, which corresponds to a third coloring portion, creates a color similar to that of the light emitted from the LED light sources 262. The side coloring portion 1005 has at least a portion positioned closer to the wavelength conversion sheet 209 than to the placement portion 1031, and surrounds the placement portion 1031. In an example illustrated in FIG. 10, the side coloring portion 1005 is provided on a front face of the rising portion 1033 to vertically and horizontally surround the placement portion 1031. The side coloring portion 1005 provided to the substrate 1003 eliminates the need for providing another member to be used for installation of the side coloring portion 1005. Such a feature makes it possible to curb a decline in production efficiency caused by, for example, an increase in the number of components, and a positioning among the members.

The side coloring portion 1005 absorbs at least a portion of the secondary light of the return light, making it possible to keep color unevenness from appearing at vertical and horizontal ends of the display surface 111 (see FIG. 1). Moreover, the side coloring portion 1005 reflects at least a portion of incident light toward the center in which the display panel 201 is positioned. Such a feature makes it possible to reduce a decline in use efficiency of light because of leakage of the light from the vertical and horizontal ends of the substrate 1003. Furthermore, the feature makes it possible to keep color unevenness from appearing at the vertical and horizontal ends of the display surface 111.

Moreover, the side coloring portion 1005 has at least a portion angled from the outer periphery portion 1032 toward the wavelength conversion sheet 209. In the example illustrated in FIG. 10, the side coloring portion 1005 is provided around the second coloring portion 1042, and angled from the second coloring portion 1042 toward the wavelength conversion sheet 209. Through appropriate adjustment of the color density and the angle of the side coloring portion 1005, the amount of the secondary light at the vertical and horizontal ends can be adjusted. Such a feature makes it possible to keep unevenness in brightness and color from appearing.

For example, the color density of the side coloring portion 1005 increases from the outer periphery portion 1032 toward the wavelength conversion sheet 209. Such a feature allows for adjustment of the amount of the secondary light at the vertical and horizontal ends of the illuminating region of the backlight 1001, making it possible to keep unevenness in brightness and color from appearing. Moreover, the feature allows for appropriate adjustment of a difference in color density on the boundary between the side coloring portion 1005 and the second coloring portion 1042, making it possible to keep color unevenness from appearing because of the difference in color density on the boundary.

Modifications of Second Embodiment: Fifth Modification

FIG. 12 schematically illustrates a display device according to a fifth modification; that is, one modification of the second embodiment. The display device includes a backlight. The fifth modification is different from the second embodiment in that a third coloring portion is formed of a base material including a member other than a substrate.

In an example illustrated in FIG. 12, a display device 1200 includes a backlight 1201. The backlight 1201 includes: the light source device 206 of the first embodiment; and a side coloring portion 1202.

The side coloring portion 1202 of this modification is different from the side coloring portion 1005 of the second embodiment; that is, a coloring layer in the side coloring portion 1202 is provided to a base material (e.g., a reflective sheet) other than the substrate 261. The side coloring portion 1202 rises forward from an outer periphery portion of the substrate 261. The side coloring portion 1202 has a back end provided to the outer periphery portion of the substrate 261. Moreover, the side coloring portion 1202 has a front end held by the frame 205. Compared with a case where a rising portion is provided to the substrate 261, such a configuration makes it possible to simplify a structure of the substrate 261.

In the example illustrated in FIG. 12, the side coloring portion 1202 is provided in front of the outer periphery portion of the substrate 261 to surround a placement portion positioned in a center of the substrate 261. However, the side coloring portion 1202 shall not be limited to such a configuration. For example, the side coloring portion 1202 may include a reflective sheet, at least a peripheral portion of which is provided with a coloring layer, placed in back of the substrate 261. The peripheral portion may rise forward from the back of the substrate.

Other Modifications

The illumination device and the display device according to an aspect of the present invention shall not be limited to the above embodiments and the modifications. A configuration obtained through various modifications shall be included in the present invention.

Described in the embodiments as an example is a backlight (an illumination device) including a light source emitting blue light as the primary light. Alternatively used may be a light source emitting light in another color as the primary light. In such a case, a wavelength conversion member is used to convert the primary light into light (the secondary light) having a complementary color of the primary light, allowing the illumination device to emit white light as illuminating light. For example, in a case where a light source emitting magenta light as the primary light is used, the wavelength conversion member to be used converts the magenta light (the primary light) into green light (the secondary light).

In the above embodiments, described as an example is the illumination device emitting white light as illuminating light. Alternatively, the illumination device may emit light other than the white light as the illuminating light. For example, a combination of the respective colors of the primary light and the secondary light may be that of colors which are not complementary to each other. In such a case, a coloring portion creating a color of the primary light can keep color unevenness due to return light from appearing.

In the above embodiments, the LED light sources are described as an example of the light source. Alternatively used may be, for example, a light source emitting light having at least a portion of the wavelength range in a visible light range, such as a laser diode (LD). Moreover, the coloring portion to be used may have a reflectance of the peak wavelength, included in the light emitting from the light source, higher than a reflectance of another wavelength.

In the above embodiments, the illumination device according to an aspect of the present invention includes a plurality of light sources as an example. Alternatively, the illumination device may include a single light source.

In the above embodiments, the display device according to an aspect of the present invention is, as an example, a liquid crystal display including a liquid crystal panel. Alternatively, the present invention does not have to be limited to such a configuration. For example, the display device may include a transmissive display panel other than the liquid crystal panel, such as an organic electro luminescence (EL) display.

Furthermore, an example of the display device according to an aspect of the present invention may be a signage device including: a display panel made of translucent film and forming an image; and a backlight illuminating the display panel.

In the above embodiments, described as an example is a backlight of an LCD including a liquid crystal panel according to an aspect of the present invention. However, the present invention shall not be limited to such a configuration. For example, such as the digital signage device, the aspects of the present invention are appropriately applicable to an illumination device emitting illuminating light toward the object.

What is claimed is:

1. An illumination device comprising:
a substrate including a first face;
at least one light source provided on the first face, and configured to emit light; and
a wavelength conversion member facing the first face of the substrate, and configured to convert at least a portion of a wavelength, of the light emitted from the at least one light source, into a wavelength having a color different from a similar color of the light emitted from the at least one light source, the similar color being a same color as, or a color closely represented in a hue circle as, a color of the light emitted from the at least one light source, wherein
the substrate includes a first coloring portion including at least a portion of the substrate, including at least a portion of the first face, and configured to create the similar color, and
the first coloring portion creates blue and is applied directly to the substrate.

2. The illumination device according to claim 1, wherein
the at least one light source emits primary light in a first wavelength range,
the wavelength conversion member is further configured to convert a portion of the primary light into secondary light in a second wavelength range different from the first wavelength range, and
in the first coloring portion, the primary light is higher in reflectance than the secondary light.

3. The illumination device according to claim 1, wherein
in the first coloring portion, the similar color is higher in color density at distances further from the at least one light source.

4. The illumination device according to claim 1, wherein
the substrate further includes:
a placement portion provided with the at least one light source; and
an outer periphery portion surrounding the placement portion,
the substrate includes a second coloring portion including at least a portion of the substrate, including at least a portion of the first face, and configured to create the similar color,
the first coloring portion is located in the placement portion,
the second coloring portion is located in the outer periphery portion, and
color density of the similar color created by the second coloring portion is lower than color density of a portion along a boundary with the second coloring portion in the first coloring portion.

5. The illumination device according to claim 1, wherein
the substrate further includes a light reflection layer configured to reflect at least a portion of incident light, and
the first coloring portion is provided on the light reflection layer so as to contact with the light reflection layer.

6. The illumination device according to claim 1, wherein
the at least one light source includes a plurality of light sources,
the plurality of light sources are arranged in a first direction at first predetermined intervals and in a second direction at second predetermined intervals, the second direction intersecting the first direction,
the first coloring portion further includes a plurality of dots arranged in the first direction at the first predetermined intervals and in the second direction at the second predetermined intervals, and
two or more of the plurality of dots, which are adjacent to one target light source of the plurality of light sources, are positioned at a predetermined distance from the one target light source.

7. The illumination device according to claim 1 further comprising
a third coloring portion configured to create the similar color, wherein the substrate further includes:
a placement portion provided with the at least one light source; and
an outer periphery portion surrounding the placement portion, and
the third coloring portion has at least a portion positioned closer to the wavelength conversion member than to the placement portion, the portion surrounding the placement portion.

8. The illumination device according to claim 7, wherein the substrate further includes a rising portion rising from the outer periphery portion toward the wavelength conversion member, and
the third coloring portion is located in the rising portion.

9. The illumination device according to claim 7, wherein the third coloring portion has at least a portion angled from the outer periphery portion toward the wavelength conversion member, and
the portion surrounding the placement portion has a color density increasing from the outer periphery portion toward the wavelength conversion member.

10. A display device comprising:
the illumination device according to claim 1; and
a display panel configured to modulate light emitted from the illumination device to display an image.

11. An illumination device comprising:
a substrate including a first face;
at least one light source provided on the first face, and configured to emit light; and
a wavelength conversion member facing the first face of the substrate, and configured to convert at least a portion of a wavelength, of the light emitted from the at least one light source, into a wavelength having a color different from a similar color of the light emitted from the at least one light source, the similar color being the same color as, or a color closely represented in a hue circle as, a color of the light emitted from the at least one light source, wherein
the substrate further includes:
a first coloring portion constituting at least a portion of the substrate, including at least a portion of the first face, and configured to create the similar color;
a placement portion provided with the at least one light source;
an outer periphery portion surrounding the placement portion; and
a second coloring portion having at least a portion of the substrate, including at least a portion of the first face, and configured to create the similar color,
the first coloring portion is located on the placement portion,
the second coloring portion is located on the outer periphery portion,
color density of the similar color created by the second coloring portion is lower than color density of a portion along a boundary with the second coloring portion in the first coloring portion, and
color density of the second coloring portion decreases as distance from the first coloring portion increases.

* * * * *